(12) United States Patent
Onoe

(10) Patent No.: US 11,121,653 B2
(45) Date of Patent: Sep. 14, 2021

(54) INVERTER GENERATOR

(71) Applicant: Honda Motor Co., Ltd., Tokyo (JP)

(72) Inventor: Yuichi Onoe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/965,926

(22) PCT Filed: Jan. 24, 2019

(86) PCT No.: PCT/JP2019/002260
§ 371 (c)(1),
(2) Date: Jul. 29, 2020

(87) PCT Pub. No.: WO2019/159632
PCT Pub. Date: Aug. 22, 2019

(65) Prior Publication Data
US 2021/0044232 A1    Feb. 11, 2021

(30) Foreign Application Priority Data

Feb. 16, 2018   (JP) .............................. JP2018-026049

(51) Int. Cl.
*H02P 9/30* (2006.01)
*H02P 9/00* (2006.01)
(Continued)

(52) U.S. Cl.
CPC ............ *H02P 9/305* (2013.01); *H02M 5/458* (2013.01); *H02M 7/12* (2013.01); *H02M 7/48* (2013.01);
(Continued)

(58) Field of Classification Search
CPC ...... H02P 9/305; H02P 9/009; H02P 2101/25; H02M 7/48; H02M 5/458; H02M 7/02
(Continued)

(56) References Cited

U.S. PATENT DOCUMENTS

| 5,430,362 A | * | 7/1995 | Carr | ........................ | F02N 11/04 |
| | | | | | 318/139 |
| 5,493,200 A | * | 2/1996 | Rozman | .................... | H02P 9/08 |
| | | | | | 322/10 |

(Continued)

OTHER PUBLICATIONS

International Search Report; Application; PCT/JP2019/002260; dated Apr. 9, 2019.

(Continued)

*Primary Examiner* — Pedro J Cuevas
(74) *Attorney, Agent, or Firm* — Duft & Bornsen, PC

(57) ABSTRACT

In an inverter generator having a generator unit including three phase windings driven by an engine, a converter having multiple switching elements and configured to convert alternating current outputted from the generator unit to direct current, an inverter configured to convert direct current outputted from the converter to alternating current and output the alternating current to a load, and a converter control unit configured to determine PWM control ON-time period and drive the multiple switching elements so that inter-terminal voltage of direct current outputted from the converter stays constant with respect to increase/decrease of the load, the converter control unit is configured to detect, with respect to voltage waveforms occurring in the three-phase windings in cycle (t−n), crossing angle between voltage waveform of one phase and voltage waveform of a phase adjacent thereto and to drive the multiple switching elements of either the one phase and the adjacent phase in cycle (t) such that the detected crossing angle is included in the PWM control signal ON-time period.

6 Claims, 4 Drawing Sheets

(51) Int. Cl.
　　　*H02M 5/458*　　(2006.01)
　　　*H02M 7/48*　　(2007.01)
　　　*H02M 7/12*　　(2006.01)
　　　*H02P 101/25*　　(2016.01)

(52) U.S. Cl.
　　　CPC .......... *H02P 9/009* (2013.01); *H02P 2101/25* (2015.01)

(58) Field of Classification Search
　　　USPC .................. 322/10, 15, 28, 46; 290/40 B, 55
　　　See application file for complete search history.

(56) References Cited

U.S. PATENT DOCUMENTS

| | | | | |
|---|---|---|---|---|
| 5,594,322 | A * | 1/1997 | Rozman | F02N 11/04 318/400.12 |
| 5,886,504 | A * | 3/1999 | Scott | H02P 25/188 322/15 |
| 5,900,722 | A * | 5/1999 | Scott | H02P 9/30 322/46 |
| 6,018,200 | A * | 1/2000 | Anderson | B23K 9/1062 290/1 A |
| 6,118,186 | A * | 9/2000 | Scott | H02P 9/04 290/1 A |
| 6,566,764 | B2 * | 5/2003 | Rebsdorf | H02P 9/42 290/44 |
| 6,586,914 | B2 * | 7/2003 | Garrigan | B60L 50/10 322/28 |
| 6,856,038 | B2 * | 2/2005 | Rebsdorf | F03D 9/255 290/44 |
| 6,859,018 | B2 * | 2/2005 | Garrigan | B60L 50/10 322/28 |
| 6,870,350 | B2 * | 3/2005 | Garrigan | B60L 50/10 322/28 |
| 10,724,489 | B2 * | 7/2020 | Matsuyama | F02N 19/005 |
| 10,742,149 | B1 * | 8/2020 | Gadiraju | F03D 9/255 |
| 10,859,064 | B2 * | 12/2020 | Biris | H02P 11/04 |
| 2002/0079706 | A1 * | 6/2002 | Rebsdorf | H02M 1/42 290/55 |
| 2003/0094917 | A1 * | 5/2003 | Garrigan | B60L 50/10 318/700 |
| 2003/0197490 | A1 * | 10/2003 | Garrigan | B60L 50/10 322/20 |
| 2003/0205989 | A1 * | 11/2003 | Garrigan | H02P 9/305 322/28 |
| 2004/0026929 | A1 * | 2/2004 | Rebsdorf | H02M 1/42 290/44 |
| 2019/0242351 | A1 * | 8/2019 | Matsuyama | H02P 27/06 |

OTHER PUBLICATIONS

Yasunori et al.; Direct AC-DC Switched-Mode Converters; (2011) 109-114.

* cited by examiner

INVERTER GENERATOR

TECHNICAL FIELD

This invention relates to an inverter generator driven by an engine.

BACKGROUND ART

In an inverter generator, AC power outputted from a generator unit is converted to DC power while stepping voltage up or down in a converter by using a three-phase bridge comprising rectifying elements and switching elements, whereafter the DC power is converted back to AC power using an inverter. Power factor in the conversion by the converter is preferably optimized. The technology proposed by Non-patent Document 1 cited below is directed to this point.

The technology described in Non-patent Document 1 is directed to proposing a BCM scheme and a CCM scheme aimed at improving power factor in a so-called direct (rectifier-less) AC-DC converter and to achieving boundary state by, for example, setting PWM signal ON-time period constant in BCM scheme so as to enable inductance current zero point detection.

PRIOR ART DOCUMENT

Non-Patent Document

Non-patent Document 1: Kobori Yasunori and Kobayashi Haruo (2011). Direct AC-DC switching converter research. *National Institute of Technology, Oyama College, Journal of Research Studies No. 44 109-114.*

SUMMARY OF THE INVENTION

Problem to be Solved by the Invention

Like Non-patent Document 1, which aims to improve converter power factor by adopting the aforesaid configuration, the object of this invention is also to provide an inverter generator configured to upgrade converter power factor.

Means for Solving the Problem

The invention provides an inverter generator comprising: a generator unit having three phase windings driven by an engine; a converter having multiple switching elements and configured to convert alternating current outputted from the generator unit to direct current; an inverter configured to convert direct current outputted from the converter to alternating current and output the alternating current to a load; and a converter control unit configured to determine PWM control ON-time period and drive the multiple switching elements so that inter-terminal voltage of direct current outputted from the converter stays constant with respect to increase/decrease of the load; wherein the converter control unit is configured to detect, with respect to voltage waveforms occurring in the three-phase windings in cycle (t–n), crossing angle between voltage waveform of one phase and voltage waveform of a phase adjacent thereto and to drive the multiple switching elements of either the one phase and the adjacent phase in cycle (t) such that the detected crossing angle is included in the PWM control signal ON-time period.

Effects of the Invention

In the invention, by driving the switching elements such that the detected crossing angle is included in the ON-time period, it becomes possible to advance a timing to switch the elements of the converter when converting AC outputted from the generator unit to DC and to increase current. In other words, driving of the associated switching elements can be started at a time point earlier than crossing angle of voltage waveforms in preceding or earlier cycle, whereby current phase can be advanced relative to three-phase AC voltage to thereby achieve enhanced three-phase AC power factor. As this enables efficient extraction of electric current, power extraction can be increased.

MODE FOR CARRYING OUT THE INVENTION

An inverter generator according to an embodiment of this invention is explained with reference to the attached drawings in the following.

Figure 1:
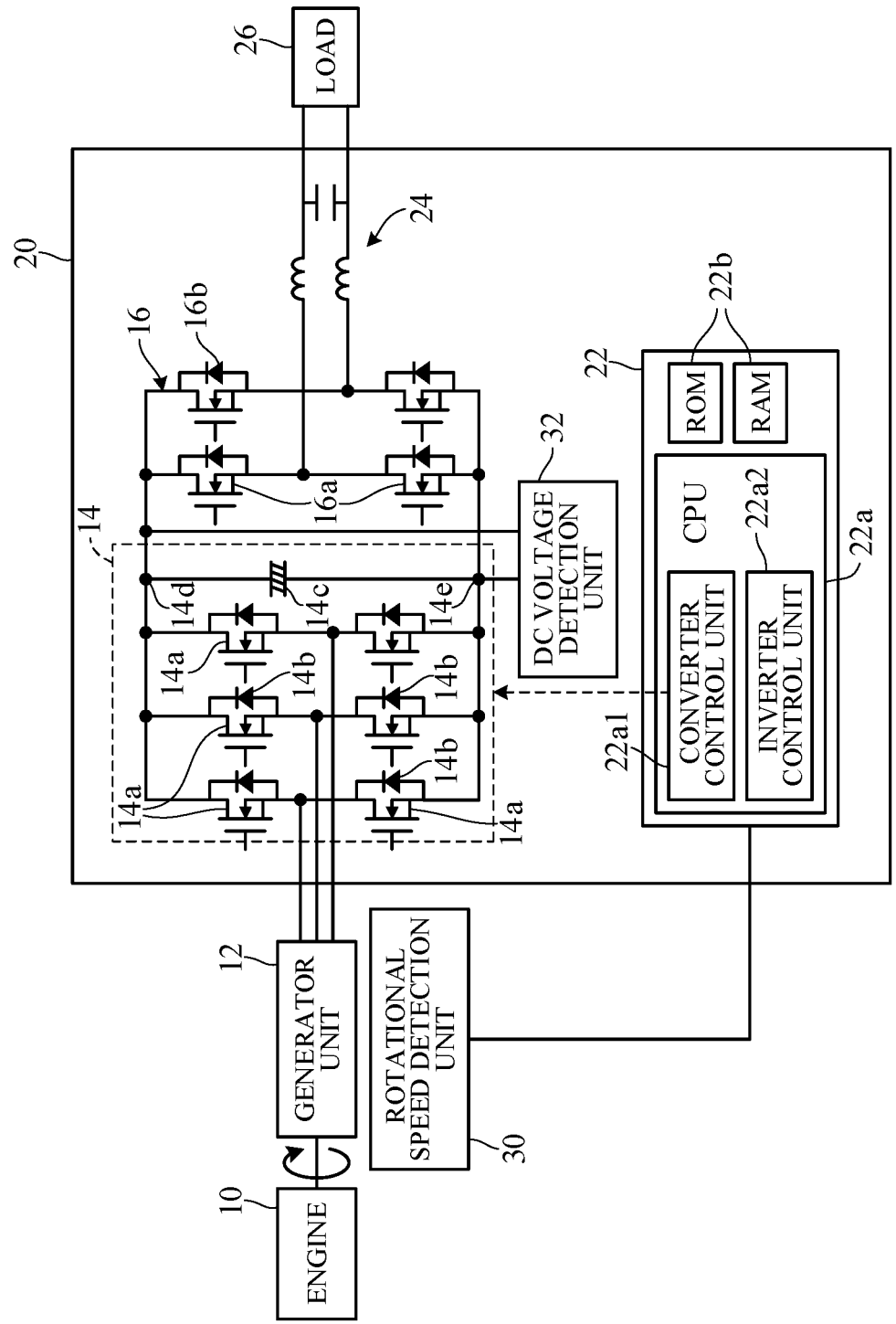
FIG. 1 is a schematic diagram generally illustrating an inverter generator according to an embodiment of this invention.
Figure 2:
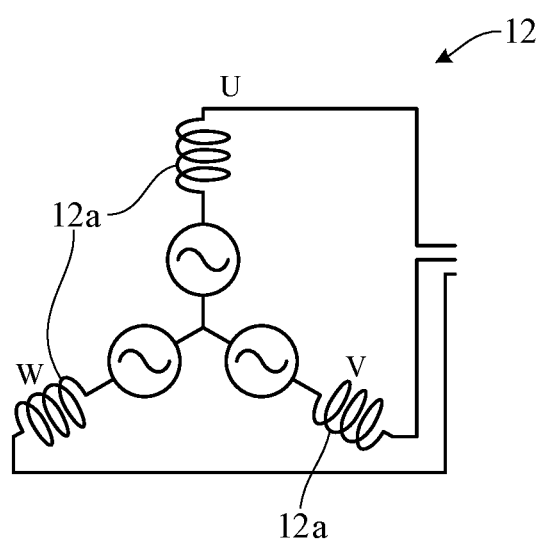
FIG. 2 is an explanatory diagram showing windings of a generator unit of FIG. 1.
Figure 3:
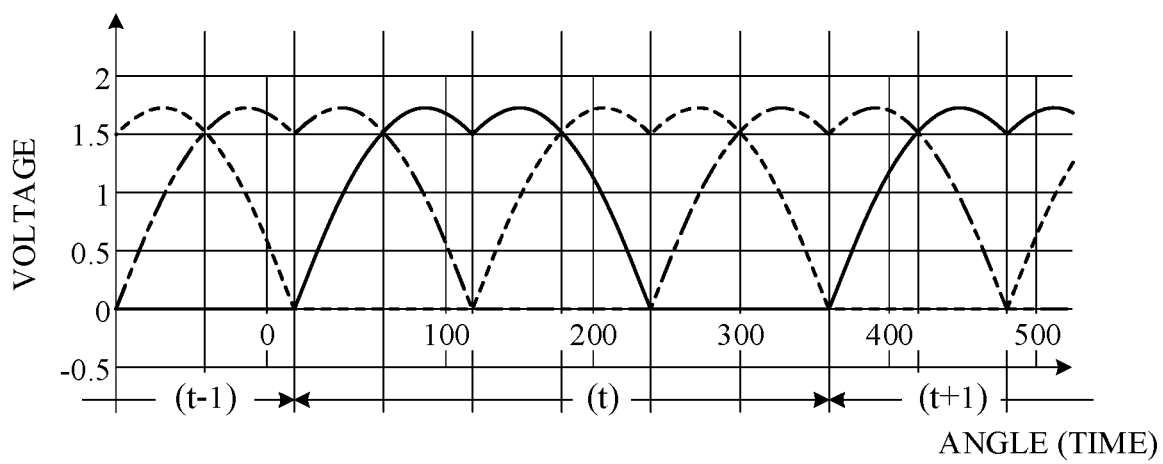
FIG. 3 is a diagram showing voltage waveform of three-phase AC outputted from the windings of FIG. 3.

FIG. 1 is a schematic diagram generally illustrating an inverter generator according to an embodiment of this invention. FIG. 2 is an explanatory diagram showing windings of a generator unit of FIG. 1. FIG. 3 is a diagram showing voltage waveform of three-phase AC outputted from the windings of FIG. 3.

As shown in FIG. 1, an inverter generator 1 comprises: an inverter unit 20 including an engine (internal combustion engine) 10, a generator unit (generator proper) 12 driven by the engine 10, a converter 14 electrically connected to the generator unit 12 that rectifies three-phase AC outputted by the generator unit 12 and an inverter 16 that converts DC outputted from the converter 14 to predetermined single-phase AC, and a control unit 22 that controls operation of the converter 14 and inverter 16.

The inverter generator 1 is a generator of user-portable weight/size well adapted for supplying power to an electrical load such as one used for farm work or when camping.

The engine 10 is, for example, a spark ignition, air cooled, gasoline fueled general purpose engine with a piston (not shown) that reciprocates inside a cylinder and a crankshaft (output shaft; not shown) that rotates synchronously with the piston. Motive power of the engine 10 is outputted through the crankshaft to the generator unit 12.

The generator unit 12 is a multipolar alternator driven by the engine 10 to generate AC power. It comprises a rotor (not shown) surrounded by permanent magnets and is connected to and rotated integrally with the crankshaft, and a stator (not shown) provided with UVW phase windings 12a arranged at phase angle differences of 120 degree as shown in FIG. 2.

As illustrated, the converter 14 is configured as a bridge circuit comprising three pairs of (total of six) transistor switching elements 14a connected one pair in association with each of the U-phase, V-phase and W-phase windings 12a of the generator unit 12. The switching elements 14a are constituted of, for example, MOSFET, IGBT or other type transistors, and a diode 14b (e.g., parasitic diode) is connected in parallel with each of the switching elements 14a.

When gates of the switching elements 14a are switched OFF, three-phase AC outputted from the generator unit 12 is rectified by the diode 14b and inputted to the inverter 16 after being smoothed by a capacitor 14c.

The inverter 16 has 2 pairs of transistor switching elements 16a (total of 4) configured as an H-bridge circuit. The switching elements 16a are, for example, also constituted of MOSFET, IGBT or other type transistors, and a diode 16b that is a parasitic diode, for example, is connected in parallel with each.

In the inverter 16, ON-OFF switching of the switching elements 16a is controlled to generate single-phase AC of desired frequency by conversion of DC outputted from the converter 14. The converted (generated) single-phase AC is passed through a filter circuit 24 having a reactor and a capacitor and outputted to a load 26.

The control unit 22 is constituted as an electronic control unit (ECU) having a microcomputer including at least a processor (CPU) 22a, memory (ROM, RAM) 22b and the like. The processor 22a has a converter control unit 22a1 that controls operation of the converter 14 and an inverter control unit 22a2 that controls operation of the inverter 16.

A rotational speed detection unit 30 comprising a magnetic pickup and the like is provided near the stator of the generator unit 12 and outputs a signal corresponding to rotor rotational speed, namely, outputs a signal indicating three-phase alternating current cycle.

A DC voltage detection unit 32 is further provided between a positive side terminal 14d and a negative side terminal 14e connected to the capacitor 14c of the converter 14 and outputs a signal indicating inter-terminal voltage of DC flowing through the capacitor 14c.

Outputs of the rotational speed detection unit 30 and the DC voltage detection unit 32 are sent to the control unit 22 to be inputted to the converter control unit 22a1. In the control unit 22, the converter control unit 22a1 ON-OFF controls the switching elements 14a of the converter 14 so that inter-terminal voltage detected by the DC voltage detection unit 32 at detection time point of the rotational speed detection unit 30 stays constant with respect to increase/decrease of load 26, i.e., stays constant notwithstanding increase/decrease of load 26.

More specifically, the converter control unit 22a1 uses PWM (Pulse Width Modulated) chopping to control ON-time period of the switching elements 14a by making duty ratio of the PWM signal (PWM waveform) (duty ratio=ON-time period t/period T) greater (longer) when load 26 increases and smaller (shorter) when load 26 decreases.

What characterizes this embodiment is that the converter control unit 22a1 is configured to use outputs of the rotational speed detection unit 30 and the DC voltage detection unit 32 to detect, in cycle (t−n) (n≥1) of three-phase (U, V, W) AC, crossing angle of voltage waveform between one phase, e.g., U phase voltage waveform, and an adjacent phase, e.g., V phase voltage waveform, and in next cycle (t) to drive switching element 14a of either the one phase and the adjacent phase based on detected crossing angle.

Namely, as shown in FIG. 3, voltage waveforms of two adjacent phases among three phases (U, V and W phases) cross in each cycle. Specifically, W phase voltage waveform and U phase voltage waveform cross when rotation angle of the rotor of the generator unit 12 is 60 degrees, U phase voltage waveform and V phase voltage waveform cross when rotation angle of the rotor is 180 degrees, and V phase voltage waveform and W phase voltage waveform cross when rotation angle of the rotor is 300 degrees. And when rotation angle of the rotor is 420 degrees, W phase voltage waveform and U phase voltage waveform cross again. Thus, voltage waveforms of two adjacent phases among the three phases periodically cross.

Figure 4:
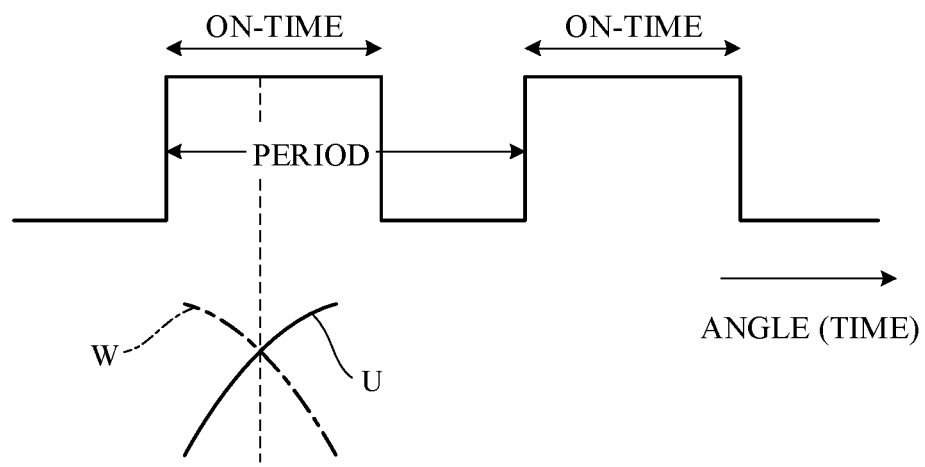
FIG. 4 is a chart showing a relationship of crossing point of voltage waveform and PWM control ON-time period of the converter of FIG. 1.

In the configuration according to this embodiment, crossing angle of voltage waveforms between one phase and an adjacent phase among the voltage waveforms occurring in the three phase windings 12a is detected in cycle (t−n) and, as shown in FIG. 4, the switching element 14a of either the one phase and the adjacent phase is driven in cycle (t) such that the detected crossing angle comes to be included in PWM signal ON-time period.

In the case of the example of FIG. 4, the switching element 14a associated with U phase among the multiple switching elements 14a in FIG. 1 is driven so that crossing angle between the U phase and W phase voltage waveforms is included in PWM signal ON-time period. More exactly, the lower switching element of U phase is driven to increase voltage when waveform for U phase is positive. Similarly, when waveform for V phase or waveform for W phase is positive, the lower switching element thereof is PWM switched to increase voltage.

In other words, voltage waveform obtained in preceding or earlier cycle is used and, taking crossing angles of two adjacent phases as reference, ON-OFF switching of the switching element 14a is started from time point before this crossing angle, thereby including the crossing angle of the voltage waveforms in PWM signal ON-time period. As termed herein, "preceding or earlier cycle" means any of all chronologically preceding cycles, i.e., from n=1 (immediately preceding cycle (t−1)) to n=2 (two cycles earlier (t−2)), and so on.

Figure 5:
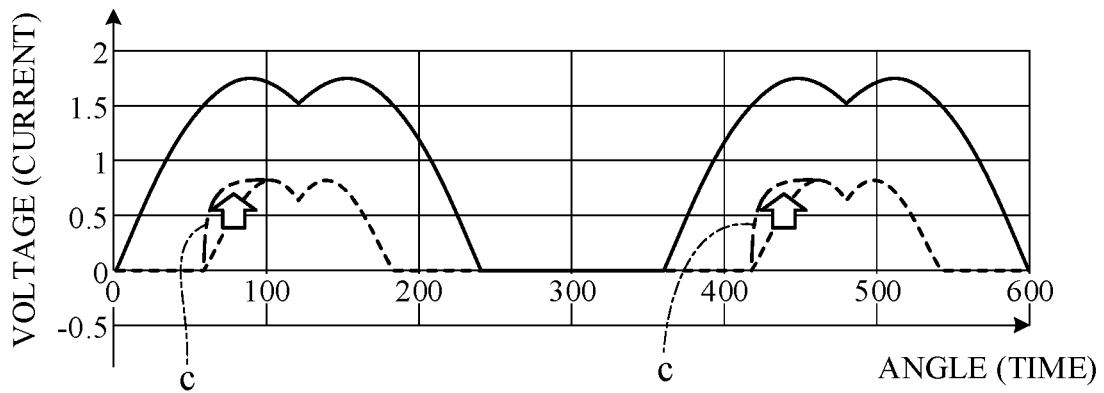
FIG. 5 is a diagram of voltage waveform showing effect of the embodiment.

The effect of this embodiment is explained in the following with reference to FIG. 5, in which solid lines indicate voltage, broken lines waveform of current corresponding thereto, and one-dot-dashed lines (symbol c) waveform of current obtained by driving the switching elements 14a in this embodiment.

As illustrated, when, for example, switching is not performed at time point of crossing, or when switching is not performed in the first place (only rectification is performed without increasing or decreasing voltage), current waveform and voltage waveform exhibit similar substantially bilaterally symmetrical shapes, whereas in the case of this embodiment, voltage waveform rises sharply from the start. In other words, obtained current value increases in response to the switching element 14a being driven earlier.

A plausible reason for this is that since switching the switching element 14a ON at a point earlier than the voltage waveform crossing angle of the two adjacent phases causes current phase to advance relative to three-phase AC voltage, three-phase AC voltage is increased by an effect similar to the Ferranti effect.

In other words, owing to the fact that the switching element 14a can be driven from a time point earlier than the crossing angle time point, current phase can be advanced relative to three-phase AC voltage to thereby achieve improved three-phase AC power factor. As this enhances efficiency of electric power extraction, more power can be extracted.

Figure 6:
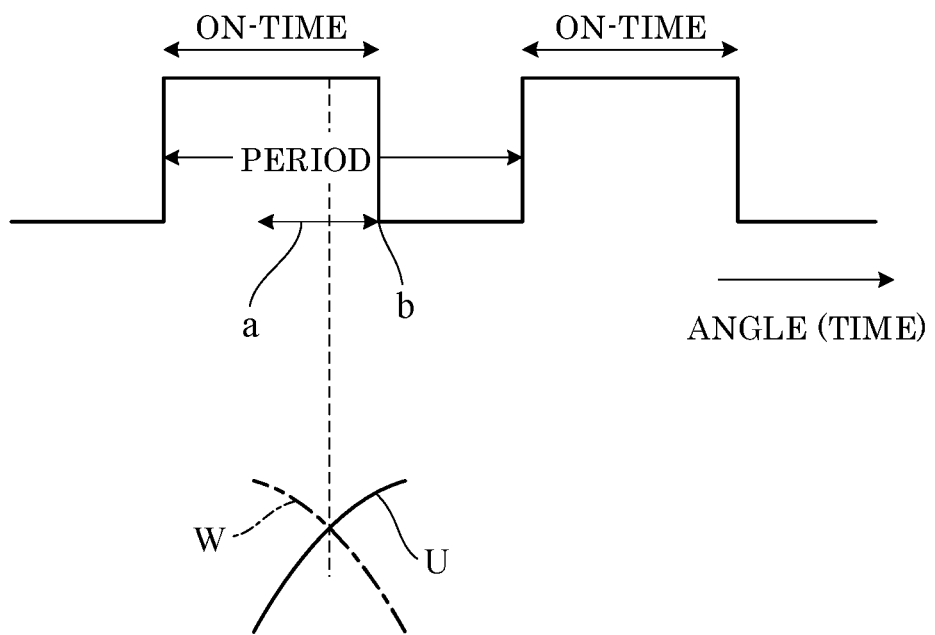
FIG. 6 is a waveform chart similar to that of FIG. 4, but showing a modification of the embodiment.

FIG. 6 is a waveform chart similar to that of FIG. 4 showing a modification of this embodiment.

As shown in FIG. 6, driving of the switching element 14a can optionally be performed such that crossing angle comes to be included in latter half of ON-time period (a in FIG. 6). As this makes effective use of voltage possible earlier, it enables still more efficient power extraction.

Moreover, driving of the switching element 14a can optionally be performed so that crossing angle comes to coincide with ON-time period termination (see b in FIG. 6), thereby achieving efficient power extraction owing to improved power factor and increased three-phase winding voltage.

Returning to the explanation of FIG. 1, the inverter control unit 22a2 in the control unit 22 controls ON-OFF switching of the switching elements 16a of the inverter 16 to obtain a desired frequency as required by the load 26. However, as this invention is characterized by the operation of the converter control unit 22a1, explanation of the inverter control unit 22a2 will be limited to the foregoing.

As described in the foregoing, the inverter generator 1 according to this embodiment comprises: the generator unit 12 having the three phase windings 12a driven by the engine 10, the converter 14 having the multiple switching elements 14a configured to convert alternating current outputted from the generator unit to direct current, the inverter 16 configured to convert direct current outputted from the converter to alternating current and output the alternating current to the load 26, and the converter control unit 22a1 configured to determine PWM control ON-time period and drive the multiple switching elements 14a so that inter-terminal voltage of direct current outputted from the converter stays constant with respect to increase/decrease of the load, wherein the converter control unit 22a1 is configured to detect, with respect to voltage waveforms occurring in the three-phase windings 12a in cycle (t–n), crossing angle between voltage waveform of one phase and voltage waveform of a phase adjacent thereto and to drive the multiple switching elements 14a of either the one phase and the adjacent phase in cycle (t) such that the detected crossing angle is included in the PWM control signal ON-time period.

In other words, a configuration is adopted whereby driving of the associated switching elements 14a is started at a time point earlier than crossing angle of voltage waveforms in preceding or earlier cycle, whereby current phase can be advanced relative to three-phase AC voltage to thereby achieve enhanced three-phase AC power factor. As this enables efficient extraction of electric power, power extraction can be can be increased.

Moreover, since the converter control unit 22a1 is configured to drive the multiple switching elements 14a of the converter 14 such that the crossing angle is included in the latter half of the ON-time period, power can be more efficiently extracted than in a case where the crossing angle of the voltage waveforms is simply made to fall within the PWM signal ON-time period.

Additionally, since the converter control unit 22a1 is configured to drive the multiple switching elements 14a of the converter 14 such that the crossing angle coincides with ON-time period termination, power can be still more efficiently extracted than when angle of the voltage waveforms is simply included in range of the PWM signal ON-time period.

Still further, efficient power extraction can be achieved to enable extraction of more electric power from the general purpose engine 10, since the engine 10 comprises a general purpose engine.

The foregoing description relates to only a single example. The present invention is not limited to the aforesaid embodiment but can be variously modified insofar as not deviated from the spirit of the present invention. One or more modifications can be combined with the aforesaid embodiment or with one another.

INDUSTRIAL APPLICABILITY

The inverter generator according to this invention can be optimally utilized in electric power generation driven by an engine or other rotating prime mover.

DESCRIPTION OF SYMBOLS 1 inverter generator, 10 engine, 12 generator unit, 12a three phase windings, 14 converter, 14a switching elements, 14b diode, 14c capacitor, 14d positive side terminal, 14e negative side terminal, 16 inverter, 20 inverter unit, 22 control unit, 22a processor, 22b memory, 22a1 converter control unit, 22a2 inverter control unit, 24 filter circuit, 26 load

The invention claimed is:

1. An inverter generator comprising:
a generator unit having three phase windings driven by an engine;
a converter having multiple switching elements and configured to convert alternating current outputted from the generator unit to direct current;
an inverter configured to convert the direct current outputted from the converter to alternating current and output the alternating current to a load; and
a converter control unit configured to determine a PWM control ON-time period and drive the multiple switching elements so that inter-terminal voltage of the direct current outputted from the converter stays constant with respect to increase/decrease of the load;
wherein the converter control unit is configured to detect, with respect to voltage waveforms occurring in the three-phase windings in cycle (t–n), a crossing angle between a voltage waveform of one phase and a voltage waveform of a phase adjacent thereto and to drive the multiple switching elements of either the one phase and the adjacent phase in cycle (t) such that the detected crossing angle is included in the PWM control ON-time period.

2. The inverter generator according to claim 1, wherein the converter control unit drives the multiple switching elements such that the crossing angle is included in a latter half of the PWM control ON-time period.

3. The inverter generator according to claim 1, wherein the converter control unit drives the multiple switching elements such that the crossing angle coincides with ON-time period termination.

4. A vehicle according to claim 1, wherein the engine comprises a general purpose engine.

5. The inverter generator according to claim 1, further including:
a rotational speed detection unit configured to output a signal corresponding to a rotational speed of the generator unit; and
the converter control unit is configured to determine the PWM control ON-time period and drive the multiple switching elements based on the signal outputted from the rotational speed detection unit.

6. The inverter generator according to claim 1, further including:
- a DC voltage detection unit configured to output a signal indicating the inter-terminal voltage between a positive side terminal and a negative side terminal of the converter; and
- the converter control unit is configured to determine the PWM control ON-time period and drive the multiple switching elements so that the inter-terminal voltage of the direct current detected from the signal of the DC voltage detection unit stays constant with respect to increase/decrease of the load.

* * * * *